United States Patent [19]

Young

[11] Patent Number: 4,971,392
[45] Date of Patent: * Nov. 20, 1990

[54] SAFETY SWIVEL CHAIR

[76] Inventor: Quentin Young, 14006 Enchanted Knight, San Antonio, Tex. 78247

[ * ] Notice: The portion of the term of this patent subsequent to Jun. 26, 2007 has been disclaimed.

[21] Appl. No.: 254,716

[22] Filed: Oct. 7, 1988

[51] Int. Cl.⁵ ............................................. A47D 1/10
[52] U.S. Cl. ..................................... 297/250; 297/349
[58] Field of Search ................ 248/418, 415; 297/250, 297/349, 325

[56] References Cited

U.S. PATENT DOCUMENTS

| | | | |
|---|---|---|---|
| 4,155,593 | 5/1979 | Swenson et al. | 297/349 X |
| 4,536,029 | 8/1985 | Rogers, Jr. | 297/349 X |
| 4,570,997 | 2/1986 | Tanizaki et al. | 297/349 |
| 4,705,256 | 11/1987 | Hofrichter | 297/349 X |
| 4,707,024 | 11/1987 | Schrader | 297/250 |
| 4,762,364 | 8/1988 | Young | 297/250 |

Primary Examiner—Peter R. Brown
Attorney, Agent, or Firm—Cox & Smith Incorporated

[57] ABSTRACT

A safety swivel chair with a child restraint device comprises a pedestal formed with a circular opening bordered by a lip. A substantially circular disk-shaped base is formed with a peripheral groove around its edge which receives the lip of the pedestal therein to pivotally engage the base to the pedestal. The base includes a pivot plate with a peripheral projection positioned to cover the opening with the projection slidingly supported on the lip, an anchor plate having a peripheral extension being positioned across the opening opposite the pivot plate with the lip between the extension and the projection, and means for holding the anchor plate in a fixed relationship with the pivot plate to establish the groove between the extension and the projection. A plurality of ball bearings are operatively mounted between the lip and the projection for pivotably supporting the projection on the pivot plate. The chair seat is reclinably attached to the base for orientation in either an upright or a reclined position, and a latch mounted on the pedestal is engageable with the base to selectively hold the chair seat in a fixed relationship with the pedestal.

8 Claims, 6 Drawing Sheets

SAFETY SWIVEL CHAIR

FIELD OF THE INVENTION

The present invention relates to seats for children which have restraining devices to hold a child in the seat. More particularly, the present invention relates to a pedestal mount for such a seat which allows the seat to be either reclined or pivoted. The present invention is particularly, but not exclusively, useful for placing, holding and subsequently removing a child from a seat which can be secured to a transport vehicle, such as a car.

BACKGROUND OF THE INVENTION

Passenger safety is unquestionably the foremost consideration in any transportation system. Unfortunately, the automobile, which is our most popular and most frequently used form of transportation, is also our least safe form of transportation. According to most experts, much of this unfortunate reality is due to the fact that many motorists fail to use available restraint devices while traveling in automobiles, trucks or similar type vehicles. Indeed, in attempts to encourage wider use of passenger restraint devices, much has been done to not only improve these devices but to also facilitate their use. Still, however, there are difficulties to be overcome.

Restraint devices which are useful for safely holding an infant or small child in a moving vehicle pose several problems in addition to those encountered with devices which are intended only for adult use. Not only must a child's restraint device be as effective as an adult's in protecting its occupant from the impact forces caused during a collision, it is also desirable that a child's restraint device be removeable from the car when it is not in use and be easily oriented for placement and removal of the child while the device is in the car.

Further, it is desirable that the restraint device be in combination with a chair which will provide comfort for the child. Although a chair seat of unitary construction might be efficacious for satisfying safety requirements, such construction is typically unwieldy within the confines of a vehicle. Consequently, several moveable infant car seats have been proposed which are intended to provide some degree of comfort for the child and, at the same time, facilitate both the placement of the child into the seat and the removal of the child from the seat while the seat remains secured to the vehicle.

As implied above, seats which can be moved, reconfigured or reoriented while in a vehicle are typically not unitarily constructed. Thus, moving parts involve additional consequent safety considerations. Further, these moving parts must be configured to cooperate in a way which does not compromise the structural integrity of the seat.

Several examples of moveable seats can be given. For instance, U.S. Pat. No. 4,205,877 to Ettridge for an invention entitled "Children's Reclining Car Seats" discloses a seat which can be moved between a slumbering position and a sitting position. Further, though not specifically intended for automobile use, U.S. Pat. No. 1,577,807 to Orwick discloses a chair which can be swiveled on its pedestal. Still further, U.S. Pat. No. 4,762,346 to Young, which is assigned to the same assignee as the present invention, discloses and claims a child restraint device for use in a moving vehicle which can be both reclined and swiveled.

As effective as the above-cited devices may be for their intended purpose, the present invention recognizes there is still, and indeed always will be, room for improving such devices by either strengthening the devices for greater safety or by making them easier to handle and use. Furthermore, the present invention recognizes that these objectives are not mutually exclusive.

In light of the above, it is an object of the present invention to provide a safety car seat for children which is sufficiently rugged to withstand impact forces and restrain the occupant from movement which might otherwise cause death or severe injury. Another object of the present invention is to provide a safety car seat for children which distributes forces over larger surface areas of the seat to help optimize the seat's structural integrity. Still another object of the present invention is to provide a safety car seat for children which can be moved and reconfigured for the comfort of the child or for facilitating placement of the child into the seat or removal of the child from the seat. Yet another object of the present invention is to provide a safety car seat for children which is easy to operate, relatively easy to manufacture and which is cost effective for its intended purposes.

SUMMARY OF THE INVENTION

The preferred embodiment for the child's safety seat of the present invention comprises a pedestal that is formed with a substantially circular opening which is bordered by a lip. A disk-shaped base having a groove around its peripheral edge is slidingly engaged to the pedestal with the lip positioned in the groove. In the preferred embodiment, the base comprises a pivot plate and an anchor plate which are held together and positioned on opposite sides of the opening. In this configuration each plate has portions overhanging the lip of the pedestal to create the groove in which the lip is received.

More specifically, the pivot plate has a projection which is slidingly supported on the lip of the pedestal when the pivot plate is positioned to cover the opening. Similarly, the anchor plate has an extension which overhangs the lip. Means, such as sets of bolts and cooperating nuts, are provided to hold the pivot plate to the anchor plate and thereby to create the groove between the projection and the extension in which the lip of the pedestal is received. With this combination the base is able to swivel on the pedestal. The seat of the safety chair is attached to the pivot plate of the base and allowed to swivel therewith on the pedestal. Further, the interaction between the pedestal's lip and both the pivot plate's peripheral protrusion and the anchor plate's peripheral extension provides a substantial area over which impact forces can be distributed to thereby help maintain the structural integrity of the safety seat.

In another aspect of a child safety seat as described above, a bearing means is provided between the lip of the pedestal and the projection of the pivot plate for supporting the pivot plate and for enabling easy swiveling of the pivot plate relative to the pedestal. In the embodiment disclosed herein, such a bearing means includes a track formed into the lower surface of the projection of the pivot plate. A circular hat rests on the lip encircling the opening in the pedestal which is formed with a circular bearing race substantially congruent with and opposed to the track on the pivot plate when the hat and pivot plate are assembled on the pedestal. A plurality of ball bearings, preferably housed in a bearing retainer, rests in this bearing race and supports the pivot plate at the track therein.

Where the hat is fabricated of a magnetic material, the formation of a window through the hat at a point on the circumference thereof can be used to provide a warning when the seat itself has swiveled out of its preferred forwardly oriented position. A magnetic material detector coupled to appropriate electronic circuitry is located on the pivot plate at the level of the hat in a position that is opposite the window when the safety seat is in this preferred orientation. When the pivot plate and the seat attached thereto are in other than this preferred position, the magnetic material of the hat to either side of the window causes the magnetic detector and the electronic circuitry associated therewith to generate a warning signal. The provision of additional windows in the hat can enable the chair to be oriented in additional corresponding positions, such as a rearwardly facing position, without generating such a signal.

In the preferred embodiment, the seat further comprises a channel mount which is fixedly attached to the pivot plate. The safety chair also comprises a guide rail which is fixedly attached to the seat and slidingly engaged with the channel mount to allow movement of the seat relative to the pedestal between an upright or sitting position and a reclining position.

The swivel action and the reclining action of the seat on the pedestal are controlled by respective latch assemblies. In particular, the latch assembly for controlling the swivel action of the safety chair includes a lever arm which is pivotally mounted on the pedestal for movement between a first and a second position. When not activated, the lever arm is urged into the first position. Diametrically opposed notches are formed on the anchor plate which are independently engageable with the lever arm when the arm is in the first position. When the arm is moved to the second position, the pivot plate and attached chair seat are freed to swivel on the base. When the arm is free to be urged into the first position, the arm is engageable with one of the notches on the anchor plate to hold the chair seat on the pedestal in either a forward or a rearward orientation.

The latch assembly for controlling the reclining action of the chair also comprises a pivotally mounted latch arm. This arm, however, is mounted on the channel mount of the chair seat and is urged into a first position wherein it is engageable with indentations on the channel mount to hold the guide rail in a fixed relationship with the channel mount and, consequently, hold the chair seat in a fixed relationship with the pivot plate of the base. In accordance with this structure, the swivel action and reclining action of the chair seat can be independently controlled.

In an alternate embodiment of the present invention, the channel mount and guide rail are removed. Instead, a plurality of support arms have their opposite ends rotatably attached respectively to the base and to the chair seat to swing the seat between an upright position and a reclining position. A lock mechanism is mounted on the base to hold the seat in either of these positions.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF THE PREFERRED EMBODIMENT

Figure 1:
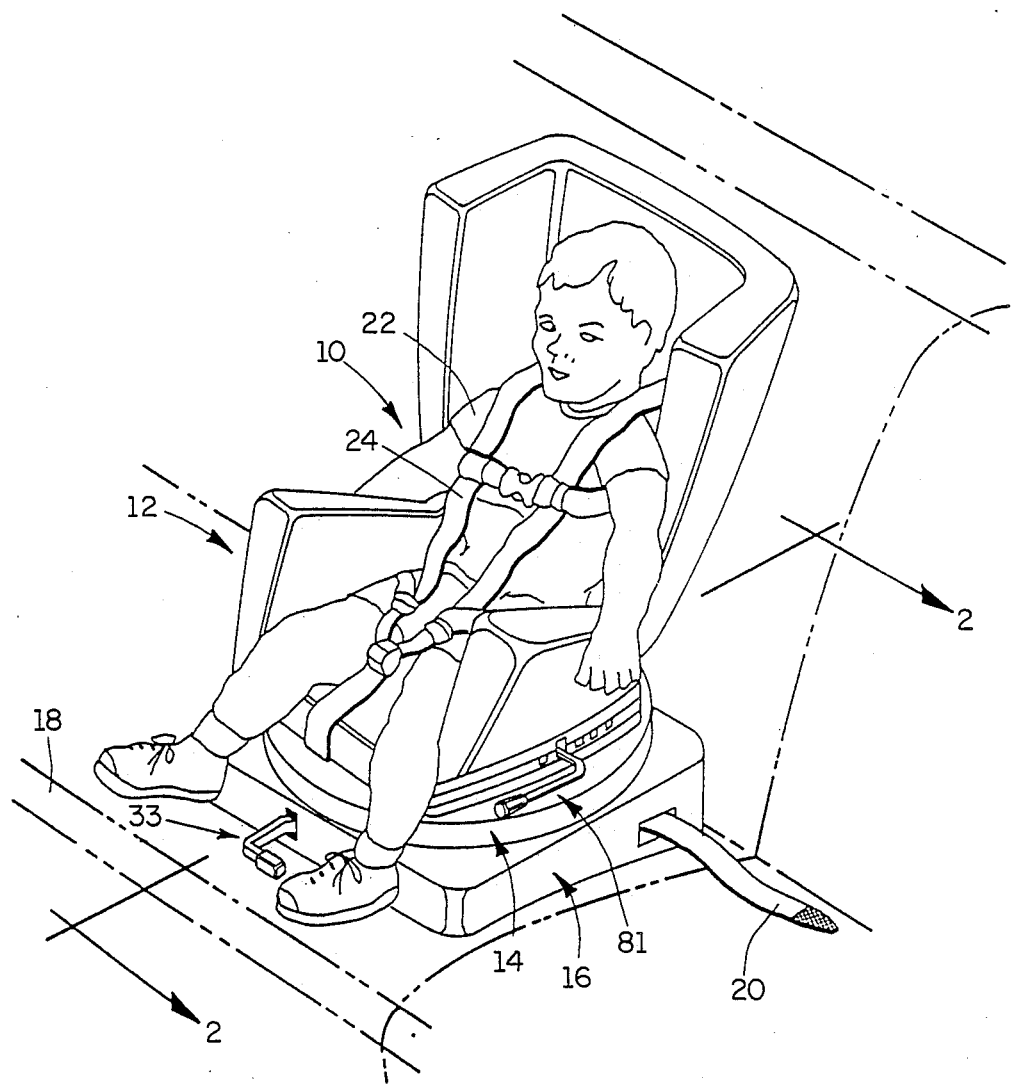
FIG. 1 is a perspective view of the safety chair with a child sitting in the seat of the chair.

Referring initially to FIG. 1, the safety swivel chair for holding a child during vehicular transport is shown and generally designated 10. As can be seen in FIG. 1, safety seat 10 generally comprises a seat 12 which is mounted on a base 14 that is pivotally attached to a pedestal 16. This combination is shown positioned on a car bench 18 to which it can be securely held by a device such as a lap belt 20.

Although a child 22 is shown in FIG. 1 being held into seat 12 by a five-point restraint harness 24, it is to be understood that any restraint device well known in the art will suffice for this purpose. For example, a car seat restraint system as manufactured and sold by the Strolee company under the mark SNUG-LOC ™ is suitable for the purposes of this invention. A rotation latch assembly 33 mounted in the forward portion of pedestal 16 and a seat inclination latch assembly 81, which may be mounted on either or both sides of safety chair 10, control the orientation of seat 12.

Figure 2:
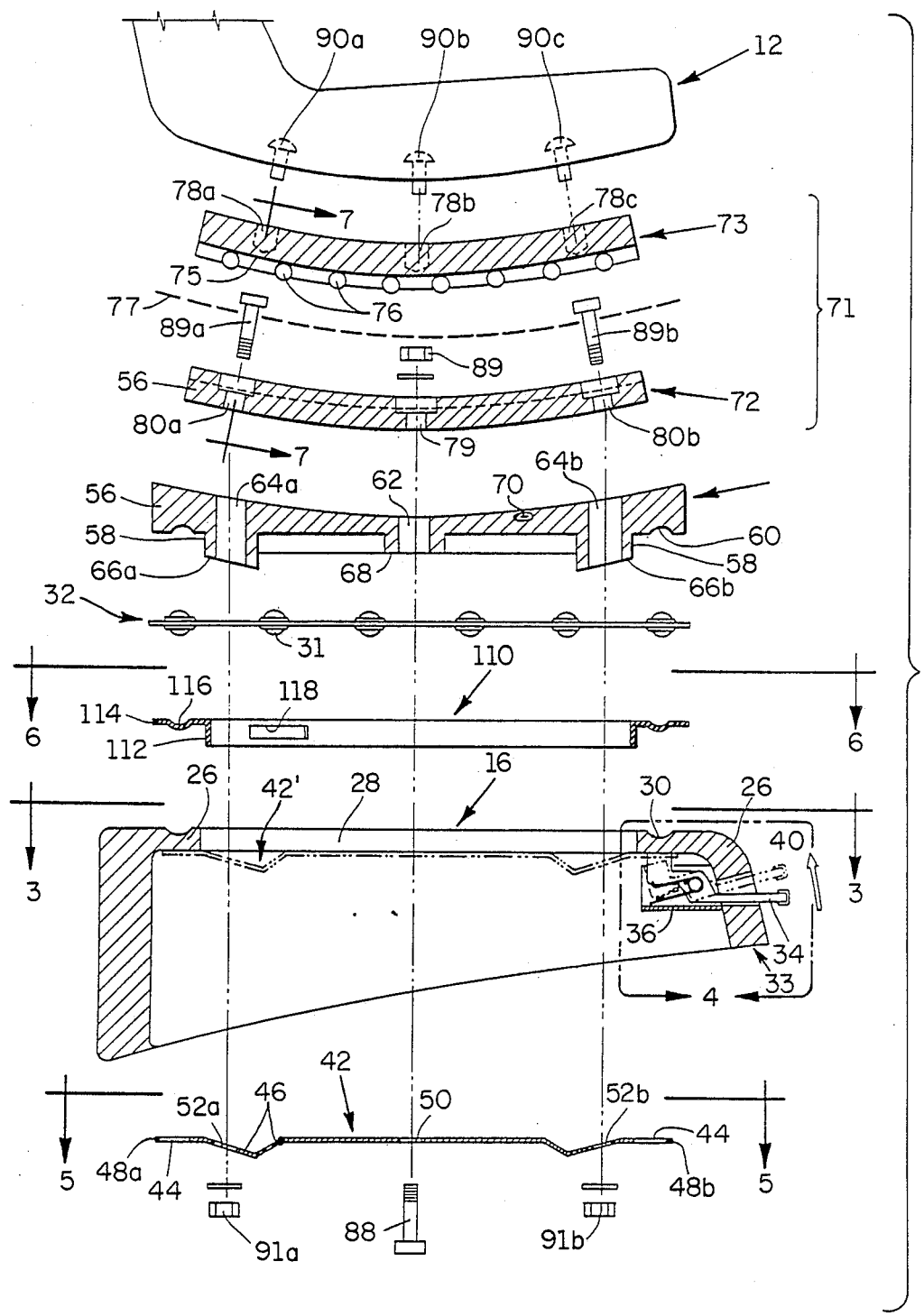
FIG. 2 is an exploded cross-sectional view of the safety chair as seen along the line 2—2 in FIG. 1 with the child removed.
Figure 3:
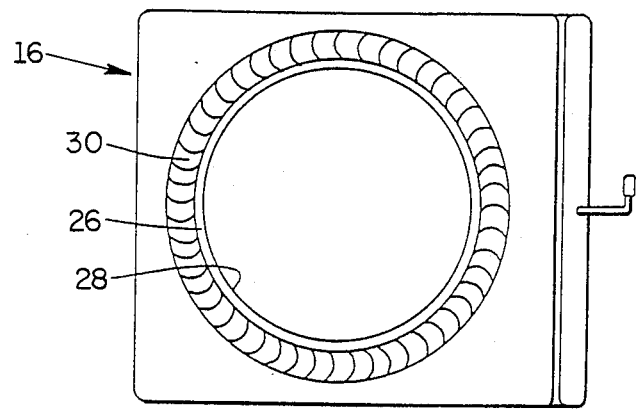
FIG. 3 is a top plan view of the pedestal of the safety chair as seen along the line 3—3 in FIG. 2.

Referring now to FIG. 2, it can be seen that pedestal 16 is formed with a lip 26 which borders a substantially circular opening 28. As best seen by cross-referencing FIG. 2 and FIG. 3, lip 26 is formed with a circular channel 30 in which a plurality of ball bearings 31 may be positioned directly in any manner well known in the pertinent art to facilitate swiveling of seat 12 on pedestal 16. Alternatively, as will be disclosed subsequently, it is preferable to interpose additional structure on lip 26 between channel 30 and ball bearings 31 to further enhance such swiveling.

FIG. 2 also shows a latch assembly 33 which is operatively mounted on pedestal 16. As seen in greater detail in FIG. 4, latch assembly 33 comprises a lever arm 34 which is mounted onto pedestal 16 for pivotal movement about a pivot pin 35. Pivot pin 35 and lever arm 34 are mounted to pedestal 16 by a mounting bracket 36 secured to the inside of pedestal 16 by screws. A spring 38 wrapped about pivot pin 35 urges lever arm 34 into a first position shown by solid lines in FIG. 4. The movement of lever arm 34 in the direction indicated by arrow 40 into a second position shown by phantom lines thus requires the application of force by an operator at the remote end of lever arm 34 in the direction of arrow 40. The actual purpose of this manipulation will be discussed subsequently.

Figure 5:
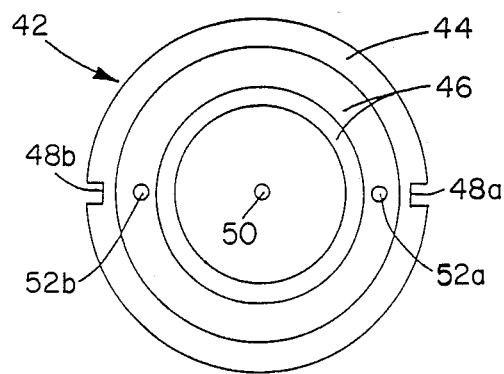
FIG. 5 is a top plan view of the pivot plate of the safety chair as seen along the line 5—5 in FIG. 2.

FIG. 2 also shows that safety chair 10 comprises an anchor plate 42. By cross-referencing FIG. 2 and FIG. 5, it will be seen that anchor plate 42 is substantially circular in shape and is formed with a peripheral extension 44 which generaly defines the edge of plate 42. As shown, anchor plate 42 is formed with an inclined indent 46 which is set in from peripheral extension 44. Notches 48a and 48b are cut into the peripheral extension 44 on diametrically opposite sides of a center hole 50 and engagement holes 52a and 52b are formed into inclined indent 46 of anchor plate 42. Like notches 48a and 48b, engagement holes 52a and 52b are also on opposite sides of center hole 50. As shown, the engagement holes 52a and 52b are formed into the outer inclined portion of indent 46 for reasons to be subsequently disclosed. It is to be appreciated that notches 48a and 48b are so aligned in order to allow seat 12 to be positioned in either a forward-facing or a rearward-facing position. The locking mechanism to establish these specific orientations will be subsequently disclosed. Further, it will be appreciated that notches 48a and 48b are only exemplary. Additional notches can also be provided as desired.

As shown in FIG. 2, a pivot plate 54 is provided with a peripheral projection 56. Peripheral projection 56 establishes one side of a groove 58 that is more completely defined when pivot plate 54 is joined to anchor plate 42, as is also shown in part in FIG. 4. Specifically, when pivot plate 54 and anchor plate 42 are joined, groove 58 is created between the peripheral projection 56 of pivot plate 54 and the peripheral extension 44 of anchor plate 42. It is also to be understood that when pivot plate 54 and anchor plate 42 are joined together, the resulting structure is disk-shaped base 14 shown in FIG. 1.

In accordance with one aspect of the present invention, bearing means are provided between lip 26 and projection 56 for supporting pivot plate 54 and for enabling easily swiveling of pivot plate 54 relative to pedestal 16. As shown by way of example and not limitation, in FIG. 2 a track 60 is formed on the lower surface of projection 56 within groove 58. Track 60 is substantially congruent with and opposed to channel 30 on the upper surface of lip 26 when pivot plate 54 covers opening 28.

Figure 6:
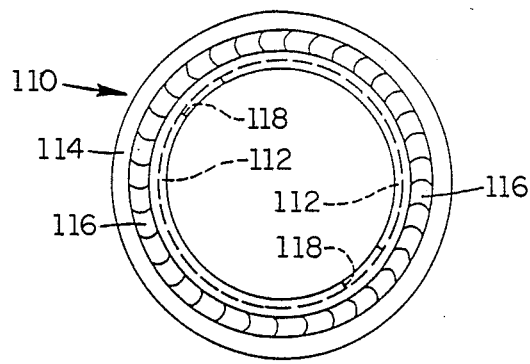
FIG. 6 is a top plan view of the hat of the safety chair as seen along the line 6—6 in FIG. 2.

In one embodiment of the present invention, a plurality of ball bearings 31 housed with a bearing retainer 32 are operably mounted between lip 26 of pedestal 16 and projection 56 of pivot plate 54 for pivotably supporting projection 56 on pedestal 16. More preferably, FIGS. 2 and 6 taken together depict a circular hat 110 which is to be positioned on lip 26 within opening 28. In this regard, hat 110 includes an annular ring portion 112 which depends into opening 28 and a radially outwardly extending flange portion 114 for resting on lip 26 in a mating relationship with channel 30, best seen in FIG. 4.

In the upper surface of flange portion 114 is formed a circular bearing race 116 substantially congruent with a track 60 when hat 110 is positioned on lip 26 and pivot plate 54 is positioned to cover opening 28. When hat 110 is employed, the plurality of ball bearings 31 ride in bearing race 116 while supporting pivot plate 54 at track 60 formed therein. It is to be appreciated that with ball bearings 31 operatively positioned in bearing race 116, or even in channel 30, pivot plate 54 rests upon pedestal 16, and by engaging ball bearings 31 with track 60, is capable of relatively resistance-free rotation for swiveling relative thereto.

Optionally, where hat 110 is fabricated of a magnetic material, it is possible through the use of an appropriate magnetic material detector located on pivot plate 54 to generate a warning signal whenever seat 12 is in other than the preferred forward-facing or rearward-facing positions thereof. Toward this end, for each such preferred position of seat 12, a window 118 is formed through annular portion 112 of hat 110. Correspondingly, a magnetic material detector (not shown for purposes of clarity) is located on pivot plate 54 in groove 58 at such a position thereon as to oppose window 118 when seat 12 is in one of its preferred positions. With this arrangement, pivoting of seat 12 out of such a preferred position will result in the detection of the magnetic material forming flange portion 114 of hat 110 to either side of window 118. Through the use of electronic or other means known in the art and coupled to the magnetic detector, a warning signal can accordingly be generated by which to warn adult occupants of the vehicle in which safety chair 10 is being employed.

FIG. 2 also shows that pivot plate 54 is formed with a center hole 62 and a pair of engagement holes 64a and 64b which are diametrically opposed to one another across center hole 62. Additionally, pivot plate 54 is formed with spacers 66a and 66b which respectively surround engagement holes 64a and 64b and a center spacer 68 which surrounds center hole 62. Further, pivot plate 54 is formed with a curved surface 70 which is on the side of pivot plate 54 opposite spacers 66a, 66b and 68.

Figure 7:
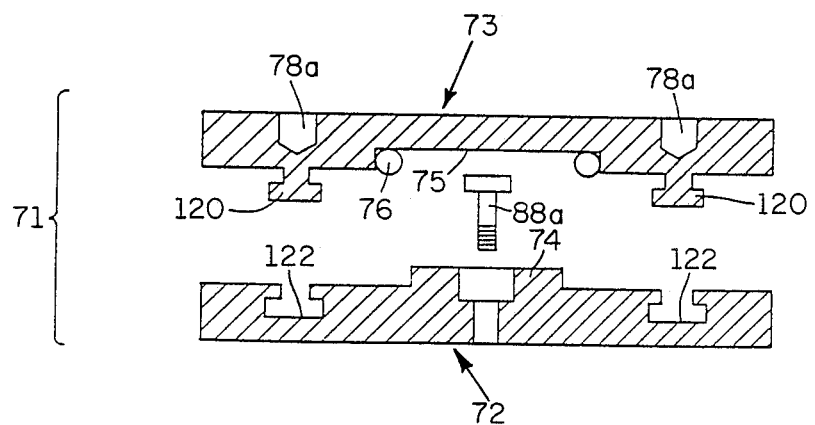
FIG. 7 is a sectional elevation view of the recline assembly of the safety chair as seen along the line 7—7 in FIG. 2.

FIGS. 2 and 7 taken together show a recline assembly 71 which comprises a channel mount 72 and a guide rail 73 slidingly supported thereon. Channel mount 72 and guide rail 73 are longitudinally slideably coupled to each other by known means, such as by elongated cooperating tongues 120 and grooves 122 oriented in the direction of the sliding desired. An upstanding elongated projection 74 on the top surface of channel mount 72 is received in a correspondingly shaped recess 75. Both projection 74 and recess 75 are oriented in a front-to-back direction in relation to seat 12. A plurality of ball bearings 76 are operatively positioned between guide rail 73 and channel mount 72 within recess 75 on either side of projection 74 to permit forward and backward sliding of guide rail 73 upon channel mount 72. This results in relative pivoting movement between channel mount 72 and guide rail 73 along a radial interface 77 therebetween.

For the purpose of securing seat 12 to guide rail 73, a series of tapped bore holes 78a, 78b and 78c are formed on either side of the top surface of guide rail 73. These tapped bore holes receive respectively threaded screws 90a, 90b, and 90c which pass through seat 12 as shown in FIG. 2. While guide rail 73 is secured for sliding motion upon channel mount 72 by tongues 120 in grooves 122, prior to the interlocking of guide rail 73 and channel mount 72, channel mount 72 is secured to anchor plate 42 so as to clamp there between pedestal 16, flange portion 114 of hat 110, bearing retainer 32, and projection 56 of pivot plate 54. Toward this end, center bore hole 79 and bore holes 80a and 80b on opposite sides thereof are formed through channel mount 72.

Figure 8:
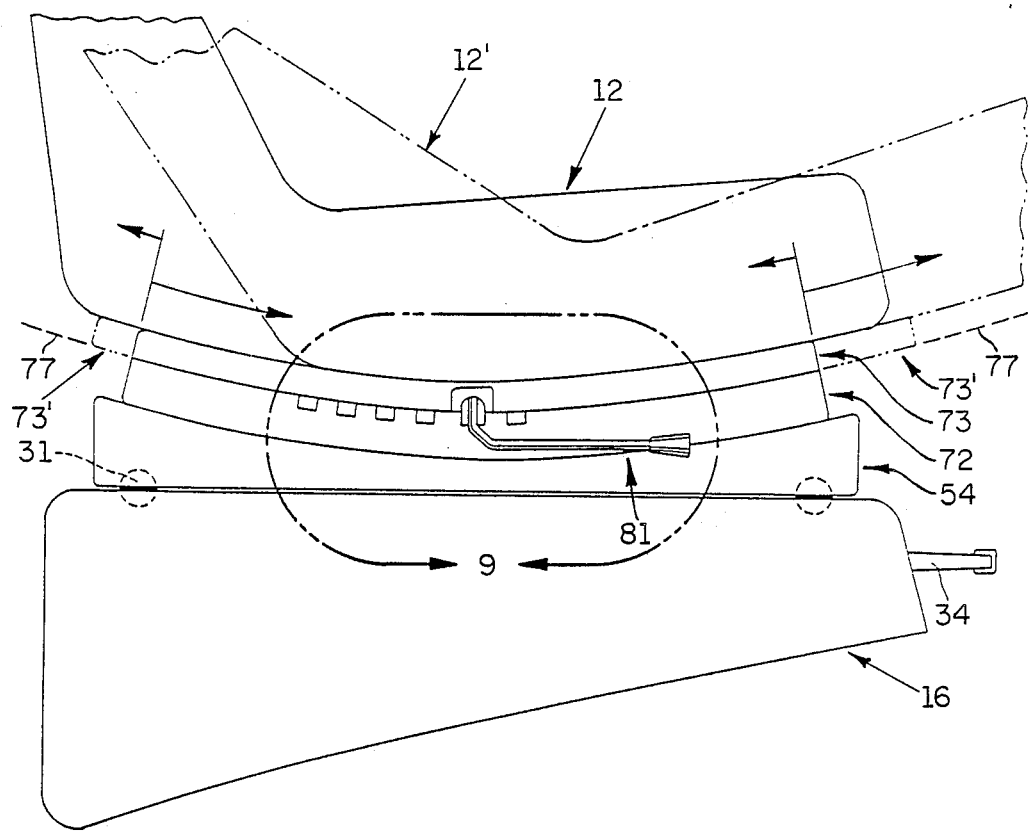
FIG. 8 is a right side view of the safety chair with a portion of the seat shown in an upright position and this same portion of the seat shown in phantom in a reclining position.
Figure 9:
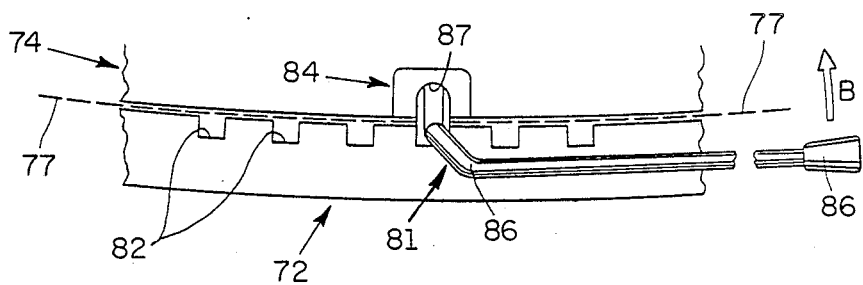
FIG. 9 is a detail elevation view of the inclination latch assembly for controlling reclining of the safety chair seen in FIG. 8.

Referring now to FIGS. 8 and 9 together, the operation of a seat inclination latch assembly 81 for controlling the sliding of guide rail 73 on channel mount 72 will be described. Channel mount 72 is positioned on guide rail 73 and slideably attached thereto in a manner already disclosed. A plurality of indentations 82 are formed onto channel mount 72. Seat inclination latch assembly 81 is selectively releasable and used to prevent relative sliding of guide rail 73 upon channel mount 72 along radial interface 77. This fixes seat 12 at any desired inclination.

Latch assembly 81 includes a pivot mount 84 which is fixedly attached to guide rail 73. A latch arm 86 is pivotally connected to pivot mount 84 and urged by a spring thereof (not shown) downwardly as viewed in FIG. 8 into an engage position. In this position, a portion of latch arm 86 is inserted into one of indentations 82 to hold guide rail 73 in a fixed relationship with channel mount 72. Manipulation of latch arm 86 upward in the direction indicated by arrow B against the urging of the spring moves latch arm 86 out of engagement with any of indentations 82 into a recess 87 in pivot mount 84. This allows guide rail 73 to slide along channel mount 72 to reconfigure the inclination of safety chair 10.

The overall assembly of safety chair 10 is best appreciated by reference to FIG. 2. Initially, hat 110 is placed in opening 28 in pedestal 16. Pivot plate 54 is positioned with ball bearings 31 between bearing race 116 on the upper side of hat 110 and track 60 on the lower side of projection 56 of pivot plate 54. Then the base 14 is constructed by joining anchor plate 42 to pivot plate 54 while lip 26 of pedestal 16 is positioned therebetween. This places anchor plate 42 in the position shown in phantom for anchor plate 42'. In this manner, anchor plate 42' is positioned over the opening 28 with peripheral extension 44 resting on the underneath side of lip 26. Once joined, pivot plate 54 and anchor plate 42 establish a disk-shaped base 14 which defines the peripheral groove 58 between projection 56 and extension 44. When pivot plate 54 and anchor plate 42 are joined, center spacer 68, which surrounds center hole 62, rests against anchor plate 42 in a position where it is also concentric with and abuts the periphery of center hole 50. In a similar manner, spacers 66a and 66b are positioned against the inclined detent 46 of anchor plate 42 in a manner which causes spacers 66a and 66b to respectively surround engagement holes 52a and 52b.

Channel mount 72 is then positioned against curved surface 70 of pivot plate 54. With anchor plate 42, pedestal 16, pivot plate 54 and channel mount 72 aligned substantially as disclosed above, center bolt 88 is inserted sequentially through center hole 50 in anchor plate 42, center hole 62 in pivot plate 54, and center bore hole 79 for engagement and tightening against a center nut 91. A center bolt 88 is inserted through bore hole 80a in channel mount 72, engagement hole 64a in pivot plate 54, and engagement hole 52a in anchor plate 42 for engagement and tightening with a nut 91a. Bolt 89a is inserted through bore hole 80a and engagement holes 64a and 52a for engagement with a nut 91a. Likewise, bolt 89b is inserted through bore hole 80b and engagement holes 64b and 52b for engagement with a nut 91b. It is to be appreciated that, with this connection, center bolt 88, and bolts 89a and 89b connect channel mount 72 with base 14 in a manner which establishes a pivotal engagement of channel mount 72 with the pedestal 16.

In accordance with the combination of structure described above, seat 12 is thus reclineable relative to the pedestal 16 by virtue of the interaction of guide rail 73 with channel mount 72. Also, seat 12 is pivotally moveable with respect to pedestal 16 by virtue of the interaction of the base 14 with respect to pedestal 16. Control of these movements is accomplished by appropriate latch assemblies.

Figure 4:
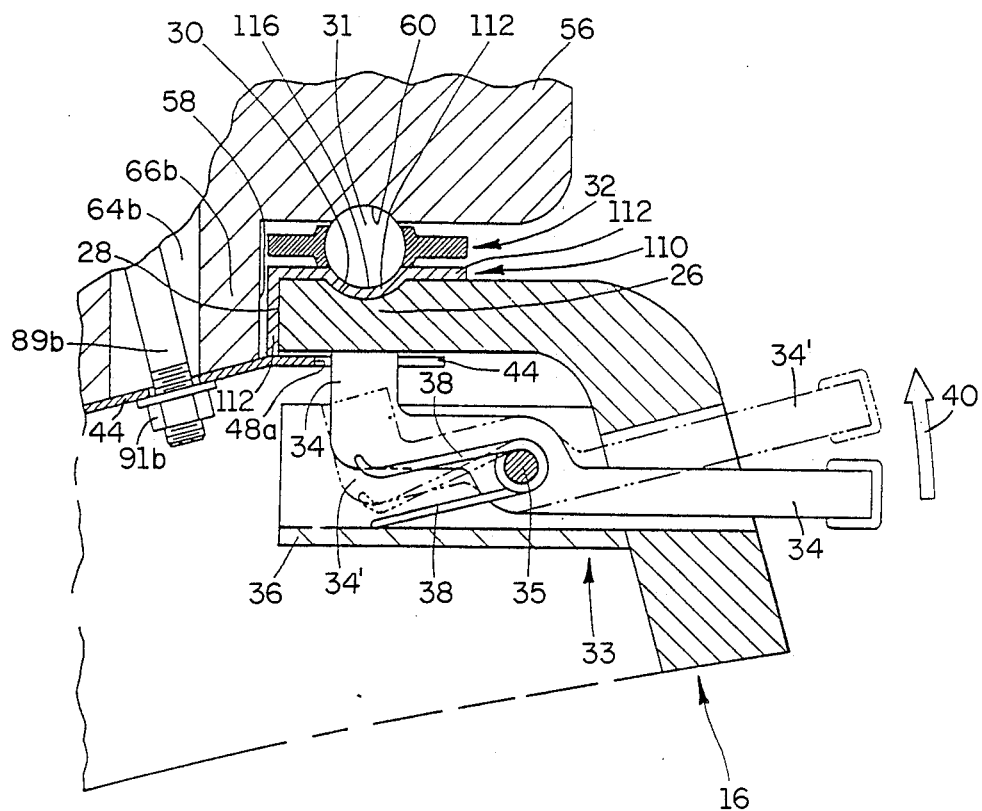
FIG. 4 is a detail elevational section of the rotation latch assembly for controlling swiveling of the safety chair seen in FIG. 2.

Specifically, as seen in FIG. 4, rotation latch assembly 33 comprises lever arm 34 which is engageable with notches 48a and 48b of anchor plate 42 to hold anchor plate 42 in a fixed relationship with respect to pedestal 16. Consequently, by virtue of the connection between anchor plate 42, pivot plate 54 and seat 12, lever arm 34 is also able to fixedly hold seat 12 in a predetermined rotational or swivel orientation with respect to pedestal 16. As shown for the present invention, notches 48a and 48b allow seat 12 to be oriented in either a forward-facing position with respect to pedestal 16 or in a rearward-facing position with respect to pedestal 16. Window 118 in hat 110 may be employed with suitable electronic circuitry to generate a warning signal when this is not the case.

The reclining action of seat 12 is controlled by seat inclination latch assembly 81 shown to advantage in FIG. 9. There the interaction of latch arm 86 with indentations 82 on channel mount 72 arrests movement of guide rail 73 along radial interface 77. More specifically, as shown in FIG. 8, when seat 12 is in an upright position, latch arm 86 is engaged with an individual one of indentations 82. It will be apparent to the skilled artisan, however, that manipulation of latch arm 86 to disengage arm 86 from indentation 82 will allow a sliding movement of guide rail 73 along channel mount 72 which reorients seat 12 into a reclined position 12' shown in phantom. This also moves guide rail 73 into a phantom position shown as 73'. Latch arm 86 is engageable with another of indentations 82 on channel mount 72 for the purpose of holding the seat in reclined position 12'.

Figure 10:
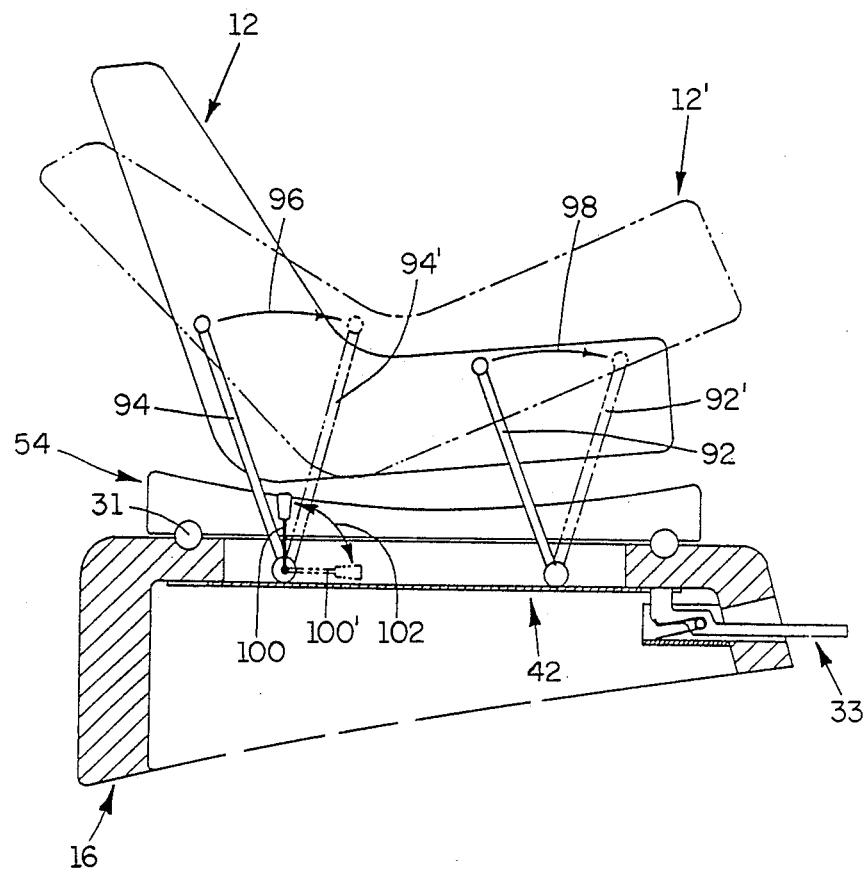
FIG. 10 is a side view of an alternate embodiment of the safety chair with portions broken away for clarity and showing the seat in an upright position and showing the seat in phantom in a reclining position.

In an alternate embodiment of the present invention the reclining assembly comprising channel mount 72 and guide rail 73 is eliminated. Instead, as shown in FIG. 10, seat 12 is connected to anchor plate 42 by a plurality of swingable support arms. A forward support arm 92 is pivotally attached to both seat 12 and anchor plate 42. Likewise, an aft support arm 94 is pivotally attached to seat 12 and to anchor plate 42. As intended by the present invention, rotation of forward support arm 92 and aft support arm 94 in the directions generally indicated by arrows 96 and 98, respectively, will swing seat 12 into a reclined position substantially as shown in phantom for seat 12'.

A locking lever 100 is provided to fixedly hold support arm 94 in either its position 94 or 94'. Manipulation of locking lever 100 to the position 100' in the direction as indicated by arrow 102 allows movement of the support arm 94. Consequently, aft support arm 94 can be moved to the position shown in phantom for aft support arm 94' and forward support arm 92 can be moved simultaneously into the phantom position shown for forward support arm 92'. Once seat 12 has been so moved, locking lever 100 can be moved back to the lock position as shown, and seat 12' will be stationarily held with respect to anchor plate 42. Subsequent movement of seat 12 between the sitting position and the reclining position can be easily accomplished merely by the manipulation of locking lever 100. In all other important respects, the alternate embodiment of the present invention is similar to that previously disclosed for the preferred embodiment.

While the particular safety swivel chair as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as defined in the appended claims.

I claim:

1. A portable, child safety swivel chair for mounting on a passenger vehicle seat comprising:
    a pivot plate having an upper surface and a lower surface; a spacing means disposed between the pivot plate and;
    an anchor plate to form a base member having a peripheral groove disposed therebetween;
    a restraining seat connected to said base member on said upper surface of said pivot plate; and
    a support pedestal for connection to said passenger vehicle seat, said support pedestal having a central opening bordered by an annular lip, said annular lip being received within said peripheral groove of said base member for rotational movement therebetween.

2. The apparatus of claim 1 further comprising:
    a lever arm pivotally mounted on said support pedestal; and
    a plurality of notches formed on said anchor plate, said plurality of notches individually engageable with said lever arm such that when any one of said plurality of notches is engaged with said lever arm, said restraining seat connected to said base member is held in a fixed relationship with said support pedestal.

3. The apparatus of claim 1 further comprising:
    a reclining means for moving said restraining seat between a substantially upright position to a substantially reclining position, said reclining means comprising:
        a channel mount connected to said pivot plate;
        a guide rail connected to said restraining seat and slidably engaged with said channel mount for pivoting said restraining seat between said substantially upright position and said substantially reclining position; and
        a means for selectively holding said guide rail in a fixed relationship with said channel mount.

4. The apparatus of claim 3 wherein said selectively holding means comprises:
    a latch arm pivotally mounted on said guide rail for movement between a first position and a second position;
    a means to urge said latch arm into said first position; and
    a plurality of indentations formed on said pivot plate engageable individually with said latch arm when said latch arm is in said first position to hold said restraining seat in a fixed relationship with said pivot plate.

5. The apparatus as in claim 3 wherein said reclining means further comprises:
    a plurality of support arms, each of said support arms having a first end rotatably attached to said anchor plate and a second end rotatably attached to said restraining seat such that said restraining seat can be moved between said substantially upright position and said substantially reclining position; and
    a means for fixedly holding said restraining seat in said substantially upright position or said substantially reclining position.

6. The apparatus of claim 1 wherein said peripheral groove comprises an annular wall formed by said spacing means, said annular wall being a force bearing surface to withstand shear forces exerted by said annular lip of said support pedestal as said lip is received within said peripheral groove of said base member for rotational movement therebetween.

7. The apparatus of claim 1 further comprising bearing means for enabling easy rotational movement of said base member relative to said support pedestal, said bearing means situated between said pivot plate and said anchor plate.

8. The apparatus as in claim 1 or 7 further comprising a means for detecting shifts in position of the restraining seat, said detecting means comprising:
    a planar hat situated between said pivot plate and said anchor plate, said planar hat comprised of a magnetic material;
    a window formed by a punched-out bordering edge through said planar hat, said window located at a predetermined position on said planar hat; and
    a magnetic material detector located on said pivot plate, said magnetic material detector aligned opposite said window in said predetermined position such that said magnetic material detector issues a signal when said window shifts out of alignment with said magnetic material detector.

* * * * *

UNITED STATES PATENT AND TRADEMARK OFFICE
CERTIFICATE OF CORRECTION

PATENT NO. : 4,971,392

DATED : November 20, 1990

INVENTOR(S) : Quentin Young

It is certified that error appears in the above-identified patent and that said Letters Patent is hereby corrected as shown below:

Col. 9, line 25 delete ";"

Signed and Sealed this

Eleventh Day of August, 1992

Attest:

DOUGLAS B. COMER

*Attesting Officer*      *Acting Commissioner of Patents and Trademarks*